United States Patent [19]
Barre

[11] Patent Number: 6,159,566
[45] Date of Patent: Dec. 12, 2000

[54] FLEXIBLE THERMOPLASTIC AND COMPRESSIBLE TUBE MADE OF THIS MATERIAL

[75] Inventor: Patrice Barre, Antony, France

[73] Assignee: L'Oreal, Paris, France

[21] Appl. No.: 09/018,850

[22] Filed: Feb. 4, 1998

[30] Foreign Application Priority Data

Feb. 4, 1997 [FR] France .................................. 97 01227

[51] Int. Cl.$^7$ .......................... B65D 85/08; B65D 85/14; C08L 23/00; C08L 23/04
[52] U.S. Cl. ........................ 428/35.7; 428/36.92; 525/88; 525/240; 206/277
[58] Field of Search .................................. 428/35.7, 35.2, 428/36.92, 500, 521; 525/240, 88, 322, 323, 247, 249, 80; 526/124.7, 125.3, 126; 206/277

[56] References Cited

U.S. PATENT DOCUMENTS

| | | | |
|---|---|---|---|
| 4,390,385 | 6/1983 | Ferguson et al. ........................ 156/229 |
| 5,124,193 | 6/1992 | Sano et al. ................................ 428/220 |
| 5,362,782 | 11/1994 | McCullough, Jr. et al. ........... 524/108 |
| 5,519,090 | 5/1996 | Schwager et al. ....................... 525/240 |
| 5,712,344 | 1/1998 | McCullough, Jr. et al. ............. 525/88 |

FOREIGN PATENT DOCUMENTS 0 084 922   8/1983   European Pat. Off. .
0 457 455 A2   11/1991   European Pat. Off. .

*Primary Examiner*—Ellis Robinson
*Assistant Examiner*—John J. Figueroa
*Attorney, Agent, or Firm*—Oblon, Spivak, McClelland, Maier & Neustadt, P.C.

[57] ABSTRACT

A flexible package is provided made of plastic, having a wall made of a thermoplastic blend containing a first and of a second polymer, wherein the first polymer is a propylene homopolymer (PP) and the second polymer is a copolymer of propylene (PP) and of ethylene (PE), and a method for producing the package by injection molding of the blend in a suitable mold. The package can be an injection-moulded tube, and is particularly suitable for the packaging of small volumes of cosmetic and/or dermatological products.

11 Claims, 1 Drawing Sheet

FLEXIBLE THERMOPLASTIC AND COMPRESSIBLE TUBE MADE OF THIS MATERIAL

BACKGROUND OF THE INVENTION

1. Field of the Invention

The present invention relates to a thermoplastic blend and to a compressible package of the tube type, obtained using this blend. The invention relates more particularly to the production of flexible plastic tubes by injection moulding, wherein the tubes are compatible with the product contained therein and the walls of which have sufficient flexibility to be compressed manually, without leaving folded areas after the compression. The package of the invention is intended, in particular, to contain a cosmetic, pharmaceutical, dermopharmaceutical product or certain food products.

2. Discussion of the Background

Currently, most of the packages used, particularly in the cosmetic field, such as tubes or bottles intended to contain a cream or a shampoo, are made of plastic. In order to manufacture them, thermoplastic polymers, such as suitable polyolefins, are generally used in an extrusion or extrusion blow-moulding process with the aid of conventional industrial equipment.

The thermoplastic polyolefins used are generally low-density polyethylenes, intended in particular for the manufacture of tubes, and high-density polyethylenes or polypropylenes which are intended for the manufacture of bottles. In particular, polypropylenes have good water-vapour impermeability properties, have the advantage of being compatible with most chemicals.

SUMMARY OF THE INVENTION

Accordingly, one object of the present invention is to provide a thermoplastic composition that is sufficiently fluid to allow the production, by injection moulding, of packages, such as compressible tubes, especially those having a wall that is thin and sufficiently flexible to be manually compressed in order to dispense the product.

Another object of the present invention is to provide a material that gives better resistance to creasing of the wall brought about by compressing the tube, and in reducing, or even eliminating, the formation of white regions in a previously creased wall region.

These and other objects of the present invention have been satisfied by the discovery of a combination of a particular copolymer with a conventional polypropylene homopolymer to form a thermoplastic blend that can be used for the manufacture, by injection moulding, of a package having the desired properties. This blend furthermore has good compatibility with the products intended to be stored in the package, in particular in the presence of certain surfactants.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
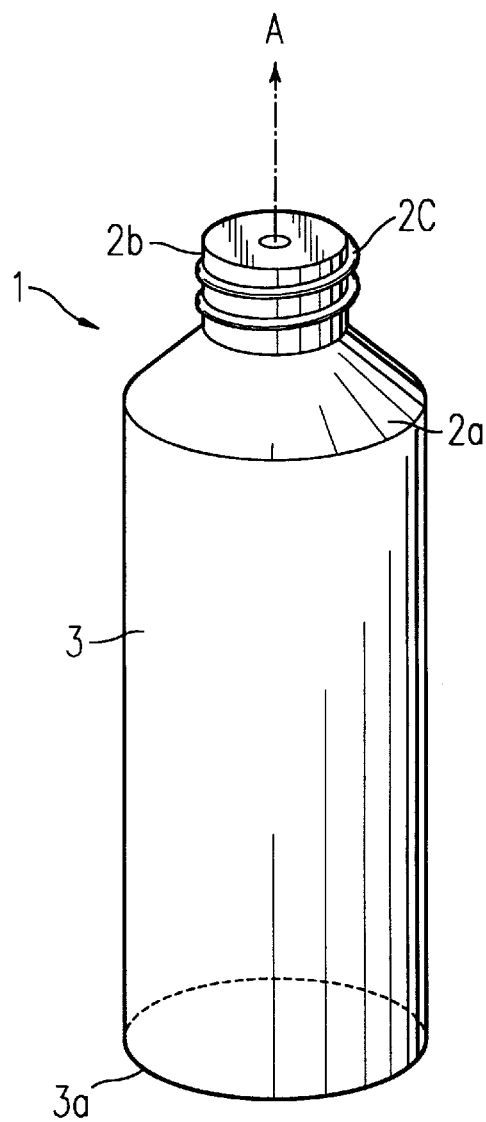
FIG. 1 represents a side view of a package according to the invention, before sealing the bottom.

The packages provided by the present invention are generally of the type having a compressible peripheral envelope open at a first free end, which, after filling with the product to be dispensed, is intended to be closed by pinching, followed by heat sealing of its free edges. Generally, the second end of the envelope is joined, for example by means of a region forming a shoulder, to a neck having a sufficient thickness to be rigid with a channel for dispensing the product passing through the neck. Usually the cross-section of the envelope is circular or oval, but other shapes are also possible, such as a polygonal shape. Preferably, the neck carries a closure means, such as a thread for fixing a closure cap, or a clip-on flange for fastening a dispensing capsule. The envelope must have, in its entirety, a shape suitable for it to be demoulded after injection moulding of the thermoplastic blend in a suitable mould.

The actual moulding of a package of the type mentioned above, by injection of a material such as polypropylene having a melt flow index suitable for injection moulding, causes no problems in practice. However, a package obtained in this way conventionally has two major drawbacks:

- on the one hand, the walls of the envelope are not sufficiently flexible to be manually compressed, and it is therefore difficult to drain the tube, and,
- on the other hand, the walls do not resume their initial shape after the envelope has been compressed and have undesirable visible folded regions which have, moreover, a whitish colour which is aesthetically unattractive.

The present invention therefore provides a flexible plastic package having a wall made of a thermoplastic blend comprising a first polymer and a second polymer, wherein the first polymer is a propylene homopolymer (PP) and, the second polymer is a copolymer of propylene (PP) and of ethylene (PE).

More particularly, the present invention provides a tube produced by injection-moulding the blend in a suitable mould.

According to one preferred embodiment of the present invention, the thermoplastic blend has a melt flow index (ISO 1133 standard, at 230° C., 2.16 kg) of approximately 25 g/10 min. Because of this relatively high flow index, the blend is particularly suitable for injection-moulding thin-walled articles.

According to another preferred embodiment of the present invention, the first polymer has a melt flow index (ISO 1133 standard) of from 20 g/10min to 200 g/10min (grades 20 to 200), preferably from 75 g/10 min. to 125 g/10 min., more preferably of 100 g/10 min. The first polymer is present in the mixture in a preferred amount of less than or equal to 50 wt. %, and preferably from 20 wt. % to 35 wt. %, with respect to the total weight of the blend.

Preferably, the second polymer (copolymer) has a melt flow index (ISO 1133 standard) of from 5 g/10 min to 20 g/10min (grades 5 to 20), more preferably from 6 g/10 min to 10 g/10 min, most preferably 8 g/10 min. The second polymer has a preferred flexural modulus, according to the ASTM D790 standard of less than or equal to 200 MPa. The second polymer is present in the blend in an amount of greater than or equal to 50 wt. %, preferably from 65 wt. % to 80 wt. %, with respect to the total weight of the blend.

According to a particularly preferred embodiment of the present invention, the second polymer is a copolymer of propylene and of ethylene, having a flexural modulus, according to the ASTM D790 standard, of less than 200 MPa, such as the PP/PE copolymer sold by the company Montell under the brand name ADFLEX®.

The thermoplastic blend of the present invention can be used, in particular, for the injection moulding of any thin-walled plastic article which has to be flexible.

When this article is a flexible tube, it preferably has a relatively rigid head, consisting of a shoulder and a neck which is provided with a dispensing hole, and a compressible peripheral wall connected to the shoulder. The peripheral wall is flexible and forms a compressible body of the tube, in which the product is packaged. A cap may be provided in order to seal the dispensing orifice during the storage period. According to one preferred aspect of the present invention, the compressible wall is approximately cylindrical, or has an oval or polygonal cross-section. When the cross-section is circular, the external diameter of the tube is preferably from 10 mm to 50 mm, more preferably from 25 mm to 35 mm. Preferably, the wall has a thickness of from 0.2 mm to 1.0 mm, more preferably from 0.4 mm to 0.7 mm, most preferably approximately 0.5 mm.

Within the indicated flow index conditions of the blend, as well as of the above-noted wall thickness, it is easily possible to mould tubes of which the length of the compressible wall, measured along the axial dimension, is less than 15 cm. Preferably, the tube dimensions are chosen such that the wall length/wall diameter ratio of the tube is less than or equal to 4. According to the present invention, such a package is obtained by injecting the blend, when hot, into a suitable mould.

Thus, after pinching and sealing of that end of the compressible wall which is opposite the dispensing head, a volume is obtained which may range from approximately 5 ml to approximately 250 ml, preferably from 30 ml to 100 ml, and more preferably from 60 ml to 80 ml. This volume is intended to contain the product, such as a cosmetic or dermatological product. The volume can be varied depending on the cross-section of the tube and on its length.

The present invention is described below with respect to an illustrative embodiment, which is provided for improving understanding of the present invention and is not intended to be limiting thereof.

Denoted by the reference 1 in FIG. 1 is a packaging assembly according to the present invention, in the form of an open tube obtained by injection moulding. The tube 1, of axis A, has a cylindrical body formed by a cylindrical sidewall 3 provided with an open end 3a. On the opposite side from the end 3a, the body is surmounted by a dispensing head 2 having a frustoconical shoulder 2a which is extended by a cylindrical neck 2b having a smaller diameter than the diameter of the body 3. The neck 2b has an external thread 2c capable of engaging with a sealing cap (not shown). The head 2 is provided with a dispensing orifice 2d of smaller diameter than the diameter of the neck 2b.

Figure 2:
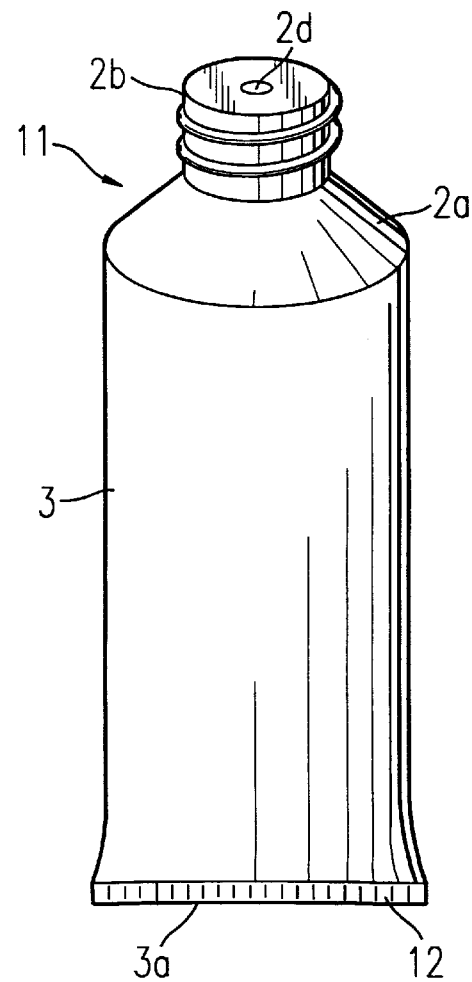
FIG. 2 represents a side view of the package of FIG. 1, after sealing the bottom.

In order to fill the tube 1, the neck 2 is closed off by a cap and the assembly is turned upside down so that the open end 3a is uppermost. A suitable amount of product is then poured into the tube. By means of a heated clamp, the free end 3a is pinched and, at the same time, a weld 12 is made, as shown in FIG. 2, in order to close off the bottom of the tube.

EXAMPLES

Having generally described this invention, a further understanding can be obtained by reference to certain specific examples which are provided herein for purposes of illustration only and are not intended to be limiting unless otherwise specified.

An open tube 1, as shown in FIG. 1, was obtained by injecting a molten blend of two polymers into a suitable mould. The injection-moulding temperature was approximately 220° C. This blend comprised:

20% of a polypropylene homopolymer, grade 100 (sold by the company Montell under the brand name MOPLEN EPN31MA), and 80% of a copolymer of propylene and of ethylene, grade 8 (sold by the company Montell under the brand named ADFLEX X100G). This tube included the head 2 and the sidewall 3. The height of the wall 3, along the axis A, was approximately 9 cm, with the thickness of the said wall 3 being approximately 0.5 mm.

After filling the tube with the product, the open end 3a of the tube was pinched and is closed off by heat sealing. The tube 11 in its final form, as shown in FIG. 2, was then obtained. It may be seen that the end 3a, having a sealing strip 12, was now closed off. Because of the small thickness of the wall 3, the tube 11 would be easily deformed, by compressing it, by a user wishing to remove a dose of product.

The cost of manufacture of a tube according to the present invention is substantially less than the cost of a tube manufactured by extrusion.

The present application is based on French Priority Application Serial No. 97-01227, filed with the French Patent Office on Feb. 4, 1997, the entire contents of which are hereby incorporated by reference.

Obviously, additional modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A single layer flexible plastic tube having a wall consisting essentially of a thermoplastic blend consisting essentially of a first polymer and a second polymer, wherein the first polymer is a propylene homopolymer (PP) and the second polymer is a copolymer of propylene (PP) and of ethylene (PE), and wherein said second polymer is present in an amount of at least 65 wt. %, with respect to the total weight of said thermoplastic blend.

2. The tube according to claim 1, wherein the tube is produced by injection-moulding the thermoplastic blend.

3. The tube according to claim 1, wherein the thermoplastic blend has a melt flow index (ISO 1133 standard) of approximately 25 g/10 min.

4. The tube according to claim 1, wherein the first polymer has a melt flow index (ISO 1133 standard) of from 20 g/10 min to 200 g/10 min.

5. The tube according to claim 1, wherein the second polymer has a melt flow index (ISO 1133 standard) of from 5 g/10 min to 20 g/10 min.

6. The tube according to claim 1, wherein the second polymer has a flexural modulus, according to the ASTM D790 standard, of less than or equal to 200 MPa.

7. The tube according to claim 1, wherein the wall has a thickness of from 0.2 mm to 1.0 mm.

8. The tube according to claim 1, wherein the thickness of the wall is from 0.4 mm to 0.7 mm.

9. The tube according to claim 1, wherein the wall has a length/diameter ratio of less than or equal to 4.

10. The tube according to claim 1, wherein the tube has a bottom obtained by pinching a free end of the wall, followed by heat sealing.

11. The tube according to claim 1, wherein the tube contains a cosmetic or dermatological product.

* * * * *